Patented Oct. 15, 1940

2,218,020

UNITED STATES PATENT OFFICE 2,218,020

(POLY-ALKYL-PHENOXY-ALKYL) (THIOCY-ANO-ALKYL) ETHERS

Gerald H. Coleman, Midland, Mich., and Robert W. Sapp, Cambridge, Mass., assignors to The Dow Chemical Company, Midland, Mich., a corporation of Michigan No Drawing. Application May 1, 1939, Serial No. 271,170

7 Claims. (Cl. 260—454)

The present invention concerns a new class of compounds, namely, the (poly-alkyl-phenoxy-alkyl) (thiocyano-alkyl) ethers.

We have prepared compounds of the aforementioned class, determined certain physical properties thereof whereby they may be readily identified, and found that they are useful as insecticidal toxicants, particularly when dissolved in petroleum distillate fractions. These compounds are for the most part viscous, high-boiling, water-white liquids, substantially insoluble in water, soluble in most petroleum distillate fractions, and somewhat soluble in organic solvents generally.

Our new compounds may be prepared by reacting the halo-alkoxy-alkyl ether of a poly-alkyl phenol with an alkali metal thiocyanate in the presence of alcohol. For example, a halo-alkoxy-alkyl ether, such as beta-(2,4-ditertiary-butyl-phenoxy)-beta'-chloro-diethyl ether, and potassium thiocyanate may be dispersed in absolute alcohol and the resulting mixture heated to its boiling temperature and under reflux for a period of time sufficient to accomplish the reaction. The reaction temperature is generally between 75° and 90° C., although somewhat lower or higher temperatures may be employed, the reaction being carried out under autogenous pressure where temperatures above the boiling temperature of the reaction mixture prevail. While any suitable proportions of the ether and thiocyanate may be employed, substantially equimolecular proportions thereof have been found to give the desired compounds in good yield. The alcohol may be employed in amount sufficient to retain the reactants and final thiocyanate ether product in solution. Following the reaction, the major part of the alcohol solvent may be removed by distillation and the residue diluted with water, whereupon a water-immiscible layer of the (poly-alkyl-phenoxy-alkyl) (thiocyano-alkyl) ether separates from solution. If desired, this thiocyanate product may be recovered by extraction with a suitable solvent, as benzene, the extract being fractionally distilled. In an alternate procedure, the water-immiscible layer may be separated, as by decantation, washed with water, and used as an insecticidal toxicant without further purification.

The (poly-alkyl-phenoxy-alkyl) (halo-alkyl) ethers employed as reactants in the preparation of our new compounds can be obtained by reacting suitable metal phenolates with the di-(halo-alkyl) ethers under conditions of temperature and pressure that favor the replacement of a single halogen atom by the poly-alkyl-phenoxy group.

166 grams (0.647 mol) of beta-(2-methyl-5-isopropyl-phenoxy)-beta'-chloro-diethyl ether (boiling at 155°–156° C. at 4 millimeters pressure), 62.9 grams (0.647 mol) of potassium thiocyanate, and 160 grams of ethyl alcohol were mixed together and heated at 80°–82° C. and under reflux for 64 hours. At the end of this time, the mixture was filtered to remove salt and fractionally distilled, whereby there was obtained 121.2 grams (0.433 mol) of beta-(2-methyl-5-isopropyl-phenoxy)-beta'-thiocyano-diethyl ether as a viscous, white liquid boiling at 205°–206° C. at 4 millimeters pressure and having a specific gravity of 1.065 at 20°/4° C.

A 3 per cent by weight solution of the foregoing compound in kerosene was tested according to the Peet-Grady method, substantially as described in Soap 8, No. 4, 1932. The knockdown of this solution against three-day old house flies was 100 per cent in 10 minutes. After 24 hours and 48 hours, the observed kills were 84 per cent and 92 per cent, respectively. This spray composition was substantially odorless and had little or no irritating effect upon the mucous membrane.

In a similar manner, other (poly-alkyl-phenoxy-alkyl) (thiocyano-alkyl) ethers may be prepared and utilized as fly spray toxicants. Representative of such compounds are the following: beta-(2-methyl-4-tertiary-butyl-phenoxy)-beta'-thiocyano-diethyl ether; beta-(pentamethyl-phenoxy)-beta'-thiocyano-diethyl ether; beta-(2-methyl-4-normal-octyl-phenoxy)-beta'-thiocyano-diethyl ether; beta-(2,5-isopropyl-phenoxy)-gamma'-thiocyano-dipropyl ether; gamma-(2,4,6-tritertiary-butyl-phenoxy)-gamma'-thiocyano-dipropyl ether; (beta-tetra-methyl-phenoxy-ethyl) (thiocyano-butyl) ether; (2-propyl-5-methyl-phenoxy-hexyl) (thiocyano-hexyl) ether; (3,5-dimethyl-phenoxy-amyl) (thiocyano-amyl) ether; beta-(2-propyl-5-methyl-phenoxy)-beta'-thiocyano-diethyl ether; and the like.

While this invention relates broadly to (poly-alkyl-phenoxy-alkyl) (thiocyano-alkyl) ethers, the compounds with which it is particularly concerned are those having the formula

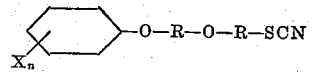

wherein each R represents an alkylene radical, X represents a lower alkyl group containing from 1 to 8 carbon atoms, inclusive, and $n$ is an integer from 2 to 5, inclusive.

The present application is a continuation-in-part of our co-pending application Serial No. 229,871, filed September 14, 1938.

We claim:

1. A (poly-alkyl-phenoxy-alkyl) (thiocyano-alkyl) ether.

2. A compound having the formula

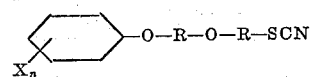

wherein each R represents an alkylene radical, X represents an alkyl group containing from 1 to 8 carbon atoms, inclusive, and $n$ is an integer from 2 to 5, inclusive.

3. A beta-(poly-alkyl-phenoxy)-beta'-thiocyano-diethyl ether.

4. A (dialkyl-phenoxy-alkyl) (thiocyano-alkyl) ether.

5. A beta-(dialkyl-phenoxy)-beta'-thiocyano-diethyl ether.

6. A beta-(2,5-dialkyl-phenoxy)-beta'-thiocyano-diethyl ether.

7. Beta-(2-methyl-5-isopropyl-phenoxy)-beta'-thiocyano-diethyl ether.

GERALD H. COLEMAN.
ROBERT W. SAPP.